(12) United States Patent
Ahn

(10) Patent No.: US 7,230,606 B2
(45) Date of Patent: Jun. 12, 2007

(54) OPTICAL MOUSE AND METHOD FOR PREVENTING ABNORMAL OPERATION OF THE SAME

(75) Inventor: Jung-Hong Ahn, Yongin (KR)

(73) Assignee: ATLab Inc. (KR)

( * ) Notice: Subject to any disclaimer, the term of this patent is extended or adjusted under 35 U.S.C. 154(b) by 550 days.

(21) Appl. No.: 10/740,214

(22) Filed: Dec. 17, 2003

(65) Prior Publication Data
US 2004/0145568 A1  Jul. 29, 2004

(30) Foreign Application Priority Data
Dec. 17, 2002  (KR) .................... 10-2002-0080814

(51) Int. Cl.
*G09G 5/08* (2006.01)
(52) U.S. Cl. .................... 345/166; 250/221
(58) Field of Classification Search ........ 345/163–167; 250/221, 222.1; 382/312, 313
See application file for complete search history.

(56) References Cited
U.S. PATENT DOCUMENTS

| | | | |
|---|---|---|---|
| 6,455,840 B1 * | 9/2002 | Oliver et al. ............ 250/222.1 |
| 6,674,475 B1 * | 1/2004 | Anderson .................... 348/367 |
| 6,753,851 B2 * | 6/2004 | Choi et al. .................. 345/166 |
| 6,797,937 B2 * | 9/2004 | Norskog et al. ............. 250/221 |
| 2004/0095323 A1 * | 5/2004 | Ahn ............................ 345/166 |
| 2004/0099798 A1 * | 5/2004 | Kwak .......................... 250/221 |
| 2004/0135825 A1 * | 7/2004 | Brosnan ...................... 345/857 |
| 2005/0161582 A1 * | 7/2005 | Lee et al. .................... 250/205 |

* cited by examiner

*Primary Examiner*—Regina Liang
(74) *Attorney, Agent, or Firm*—Cantor Colburn LLP

(57) ABSTRACT

Disclosed is an optical mouse and method for preventing abnormal operation of the same. The method comprises the steps of (a) when a shutter-on time of an image sensor is continuously increased or decreased, obtaining a plurality of frames for the shutter-on time, and (b) calculating and outputting a movement value of the optical mouse using one frame obtaining a surface image with the highest accuracy from among the plurality of frames obtained in the step (a). Thus, by sensing the time when the optical mouse passes through an interface having an obvious difference in brightness and preventing the wrong movement value from being outputted, it is possible to prevent the abnormal operation of the optical mouse.

6 Claims, 8 Drawing Sheets

OPTICAL MOUSE AND METHOD FOR PREVENTING ABNORMAL OPERATION OF THE SAME

CROSS-REFERENCE TO RELATED APPLICATION

This application claims the benefit of Korean Patent Application No. 2002-80814 filed on Dec. 17, 2002, the disclosure of which is hereby incorporated herein by reference in its entirety.

BACKGROUND OF THE INVENTION

1. Field of the Invention

The present invention relates to an optical mouse and, more particularly, to an optical mouse and method for preventing abnormal operation of the same, capable of preventing the optical mouse from outputting a wrong movement value when the optical mouse passes through an interface of a surface having an obvious difference in brightness.

2. Description of the Related Art

In general, as shown in FIG. 1, an optical mouse is designed so that light 7 emitted from a light source 8 is reflected from a worktable surface 2, and the reflected light 6 is inputted through a lens 5 into an image sensor 3 consisting of a semiconductor chip. Therefore, the optical mouse 1 obtains a surface image by calculating a quantity of light incident into the image sensor 3.

Then, the optical mouse stores the currently obtained surface image as a sample frame, begins at the left-upper corner of the sample frame to perform zigzag scanning in unit of pixel, and finds a location of the sample frame having the highest correlation with a reference region of a reference frame to calculate moved direction and distance, V(X, Y).

Here, the optical mouse controls the quantity of light incident into the image sensor 3 to be maintained at a constant level in such a way that a shutter-on time of the image sensor 3 is decreased when a bright surface image is obtained in order to accurately read out the surface image, while the shutter-on time of the image sensor 3 is increased when a dark surface image is obtained.

However, it is not easy for the optical mouse to control the shutter-on time of the image sensor 3 in order to read out the image of the surface having an obvious difference in brightness.

FIG. 2 is a timing diagram of control signals which a conventional optical mouse generates in order to control an image sensor, and FIG. 3 shows images obtained by the control signals of FIG. 2.

While the optical mouse gradually moves on the surface, particularly, from a dark location past an interface having an obvious difference in brightness to a bright location, the optical mouse sequentially decreases shutter-on times T1, T2, T3 and T4 of the image sensor 3.

Thus, each of the shutter-on times T1, T2, T3 and T4 has a relative magnitude as follows:

T1>T2>T3>T4

The optical mouse generates shutter control signals Shutter_ctrl reflecting each reduced shutter-on time and sampling control signals Sampling_ctrl for obtaining surface images corresponding to shutter control signals, and transmits the generated control signals to the image sensor 3.

As a result, the image sensor 3 accumulates light which is inputted by shutter-on when the shutter control signals Shutter_ctrl received from the optical mouse become a high level. Then, the image sensor 3 responds to the sampling control signals Sampling_ctrl toggled to the high level, and obtains images corresponding to the quantity of light accumulated for the shutter-on time to provide the obtained images to the optical mouse.

In the case where the image sensor 3 obtains a first image 11 in response to the control signals Shutter_ctrl and Sampling_ctrl, because the shutter-on time T1 is adjusted to be suitable for the dark surface, the image sensor 3 is capable of obtaining the image accurately reflecting unevenness or dissimilarity of the dark surface.

Meanwhile, in case where the optical mouse gradually moves from the dark surface to the bright surface, the shutter-on times T2 and T3 are gradually reduced, so that the unevenness or dissimilarity of the dark surface becomes obscure step by step as in second and third images 12 and 13.

This phenomenon becomes stronger when the bright surface becomes more than a predetermined region as in fourth image 14.

On the way to do so, when the bright surface exceeds more than the predetermined region as in fourth image 14, no profile representing the unevenness or dissimilarity exists on the dark surface.

As mentioned above, when the conventional optical mouse passes through the interface of the surface having the obvious difference in brightness, it is impossible to properly adjust the shutter-on time for simultaneously sensing the two surfaces where the difference in brightness is obvious.

Consequently, the conventional optical mouse fails to discriminate the unevenness or dissimilarity of the surface. For this reason, there is a problem in that the optical mouse calculates a wrong movement value to cause abnormal operation.

SUMMARY OF THE INVENTION

It is, therefore, an object of the present invention to provide an optical mouse and method for preventing abnormal operation of the same, capable of preventing the abnormal operation generated when the optical mouse passes through an interface of a surface having an obvious difference in brightness.

In order to accomplish this object, according to a first aspect of the present invention, there is provided a method for preventing abnormal operation of an optical mouse, comprising the steps of: (a) when a shutter-on time of an image sensor is continuously increased or decreased, obtaining a plurality of frames for the shutter-on time; and (b) calculating and outputting a movement value of the optical mouse using one frame obtaining a surface image with the highest accuracy from among the plurality of frames obtained in the step (a).

In order to accomplish this object, according to a second aspect of the present invention, there is provided an optical mouse comprising: an image sensor for obtaining a surface image in response to a shutter control signal and outputting the obtained surface image in response to a sampling control signal; and an image data processor for generating and outputting the shutter control signal and the sampling control signal in response to the surface image, and when a plurality of frames are received from the image sensor, calculating a movement value using one frame obtaining the surface image with the highest accuracy from among the received plurality of frames.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout the specification.

Figure 1:
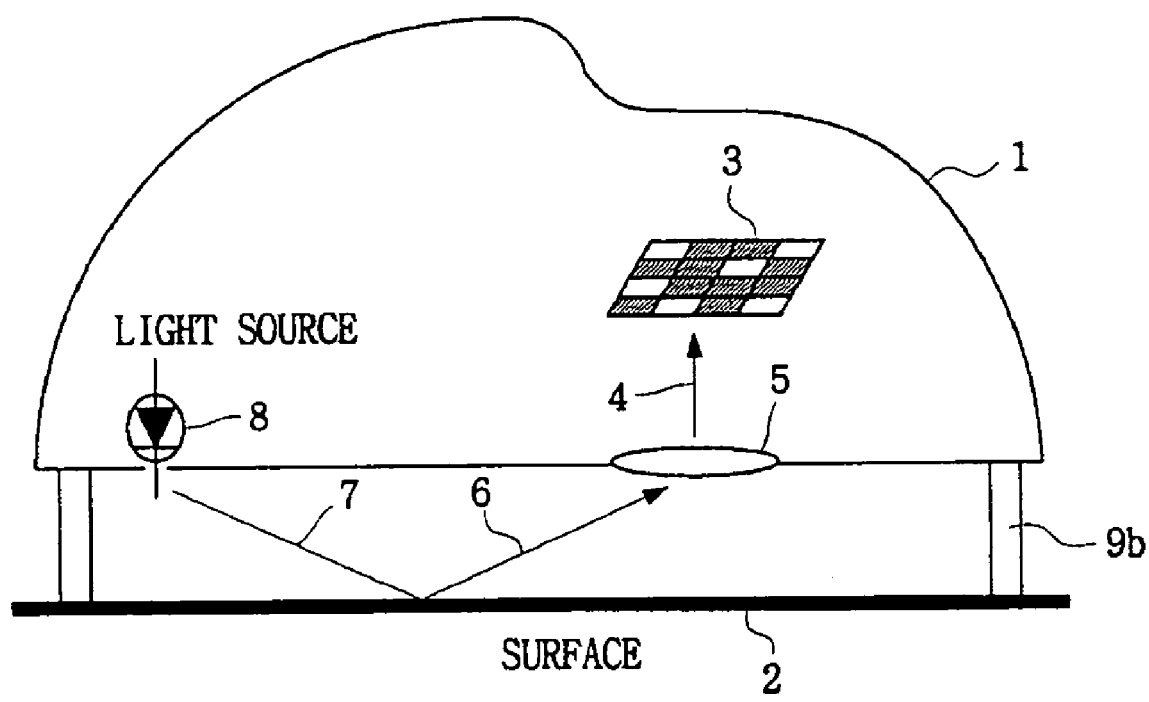
FIG. 1 illustrates a general optical mouse.
Figure 2:
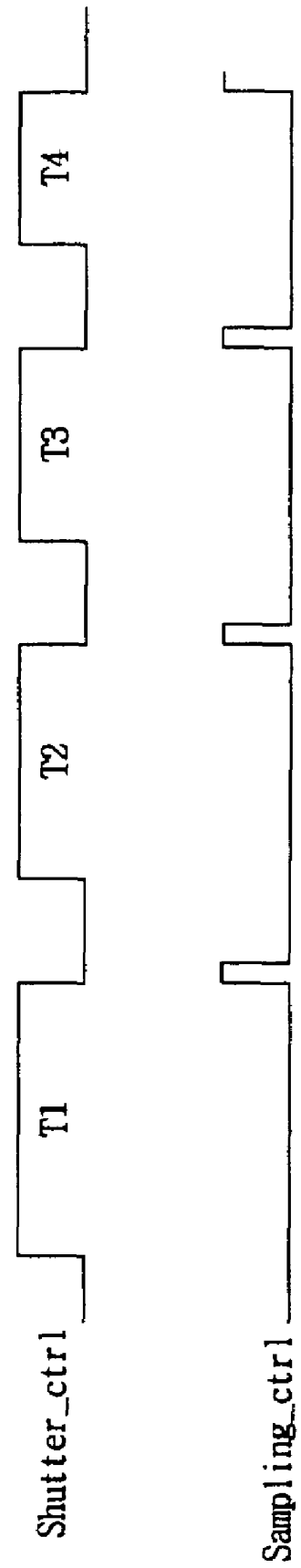
FIG. 2 is a timing diagram of control signals which a conventional optical mouse generates in order to control an image sensor.
Figure 3:
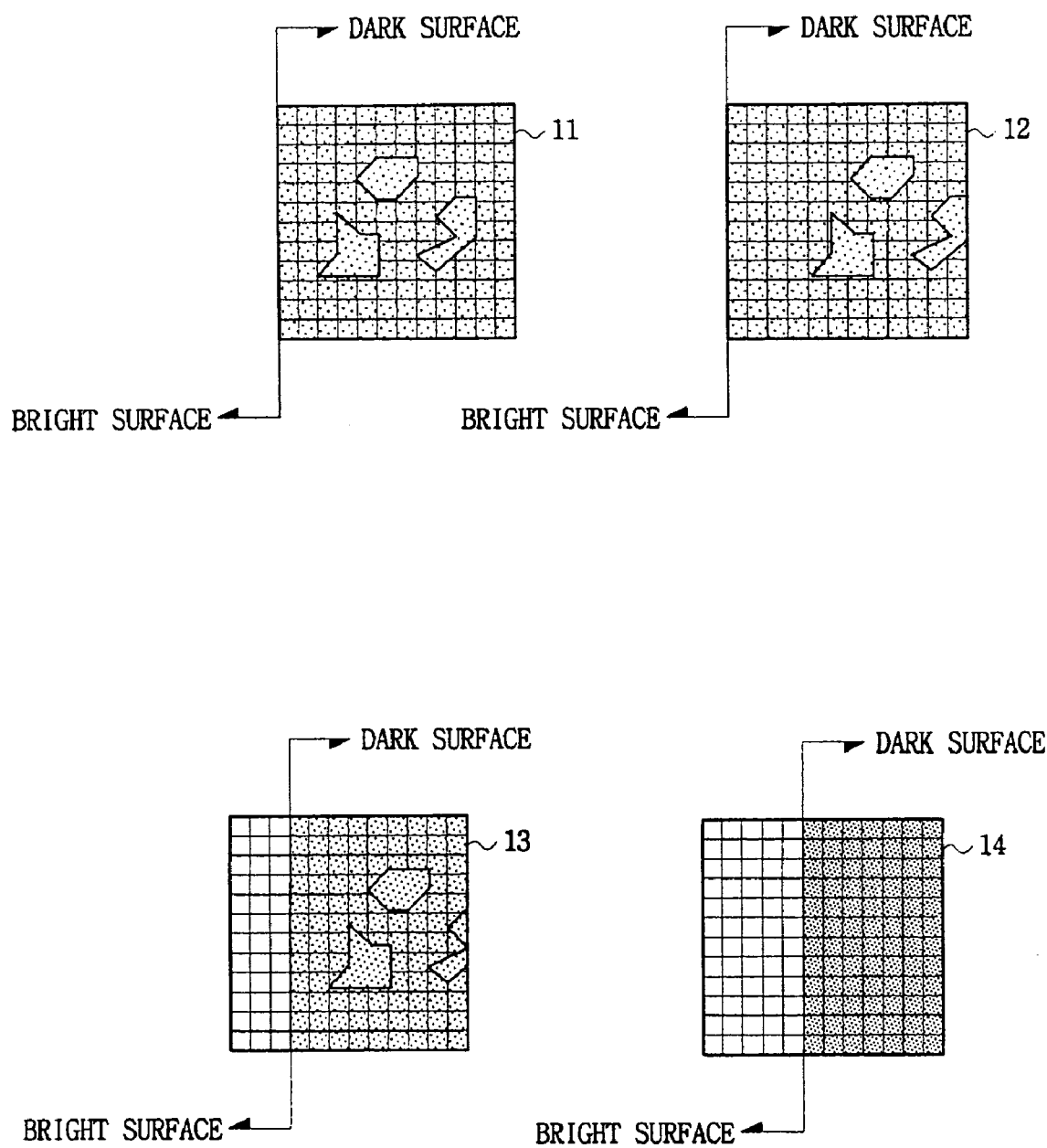
FIG. 3 shows images obtained by the control signals of FIG. 2.
Figure 4:
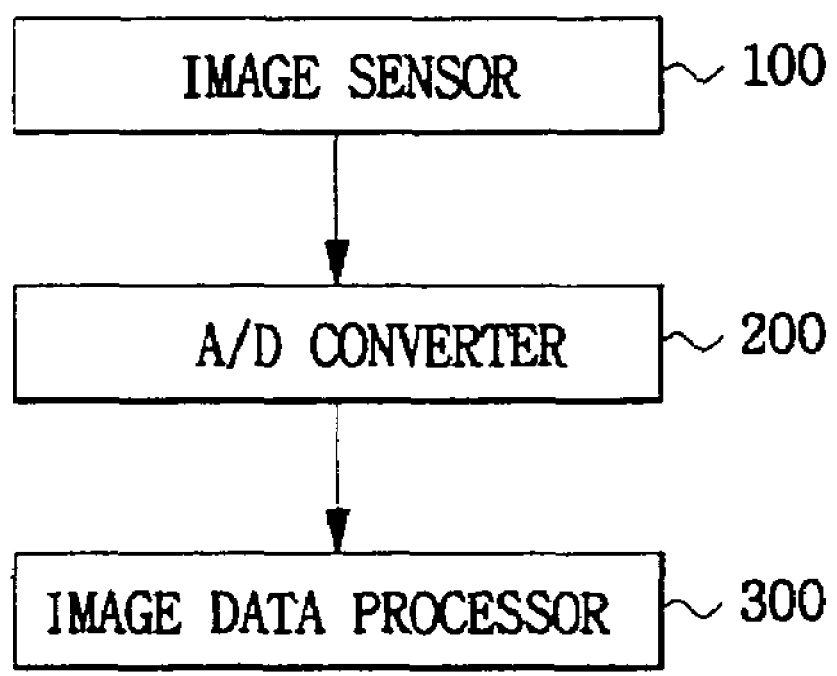
FIG. 4 is an internal block diagram of an optical mouse according to the present invention.

FIG. 4 is an internal block diagram of an optical mouse according to the present invention.

Referring to FIG. 4, the optical mouse includes an image sensor 100, an A/D converter 200 and an image data processor 300.

The image sensor 100 adjusts a shutter-on time in response to a shutter control signal Shutter_ctrl, accumulates light inputted through a lens according to the adjusted shutter-on time, obtains an image corresponding to a quantity of the accumulated light in response to a sampling control signal Sampling_ctrl, and generates and outputs the obtained image in an analog signal type.

The A/D converter 200 converts the image of the analog signal type outputted from the image sensor 100 into an image of a digital signal type, and provides the converted image to the image data processor 300.

The image data processor 300 calculates the shutter-on time of the image sensor 100 using the image of the digital signal type outputted from the A/D converter 200, generates the shutter control signal Shutter_ctrl corresponding to the calculated shutter-on time, and provides the generated shutter control signal Shutter_ctrl to the image sensor 100.

In case where the calculated shutter-on time is included in a "shutter control time," the current optical mouse determines to be passed through an interface of a surface having an obvious difference in brightness, generates the sampling control signal Sampling_ctrl for causing the image sensor 100 to sample and output a plurality of images for the shutter-on time, and provides the generated result to the image sensor 100.

Here, the "shutter control time" refers to a period in which the shutter-on time of the image sensor 100 is continuously increased or decreased.

Then, when the plurality of images are transmitted from the image sensor 100, one of the images, i.e., the image reflecting a profile of the surface with the highest accuracy is set as a sample frame. By comparing the sample frame with a reference region of a reference frame, a movement value, V(X, Y), of the optical mouse is calculated and outputted.

On the contrary, in case where the calculated shutter-on time is not included in the "shutter control time," the current optical mouse determines to be passed through a normal surface, sets the currently inputted image as the sample frame, and calculates and outputs the movement value, V(X, Y), of the optical mouse by comparing the sample frame with the reference region of the reference frame.

Hereinafter, the optical mouse and method of preventing abnormal operation of the same will be described with reference to the drawings.

Figure 5:
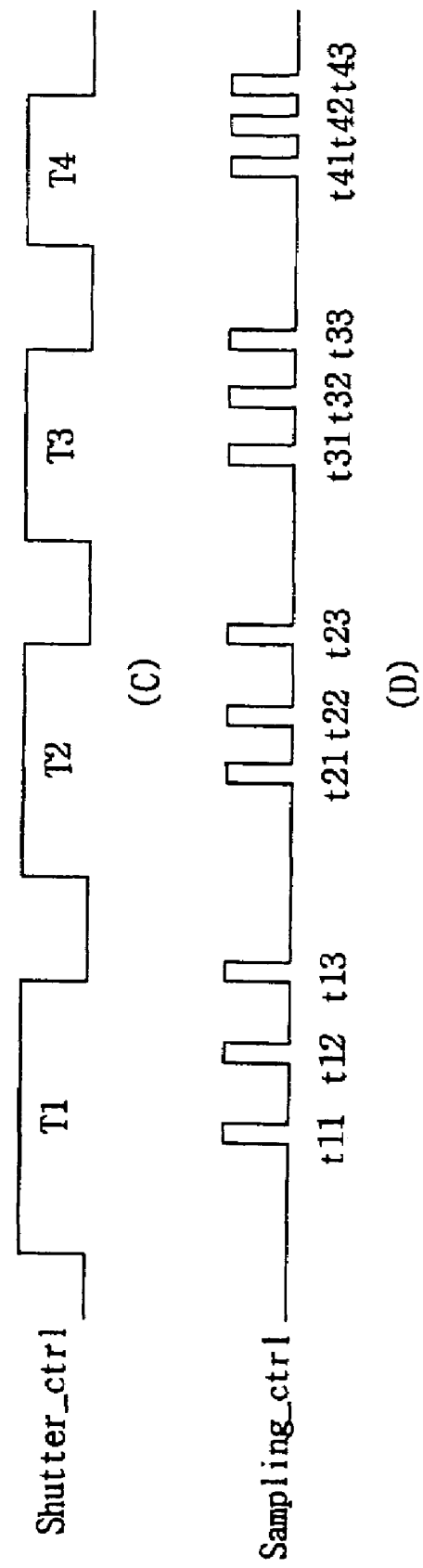
FIG. 5 is a timing diagram of control signals which the image data processor of FIG. 4 generates in order to obtain an image by means of an image sensor.

FIG. 5 is a timing diagram of control signals which the image data processor of FIG. 4 generates in order to obtain an image by means of an image sensor.

As shown in FIG. 5, when the "shutter control time" period where the shutter-on time is continuously increased or decreased arrives, the image data processor 300 generates the shutter control signal Shutter_ctrl and the sampling control signal Sampling_ctrl which makes it possible to sample the plurality of images, and provides the generated control signals to the image sensor 100.

Then, when the shutter control signal Shutter_ctrl having a high level is received, the image sensor 100 is shuttered on, and then accumulates the light inputted through the lens.

The image sensor 100 responds to the sampling control signal Sampling_ctrl toggled to the high level according to transitions t11, t12, t13 and t14 of the shutter-on time, obtains the image corresponding to a quantity of light accumulated up to one of the current time points t11, t12, t13 and t14, and provides the obtained image to the image data processor 300.

Figure 6:
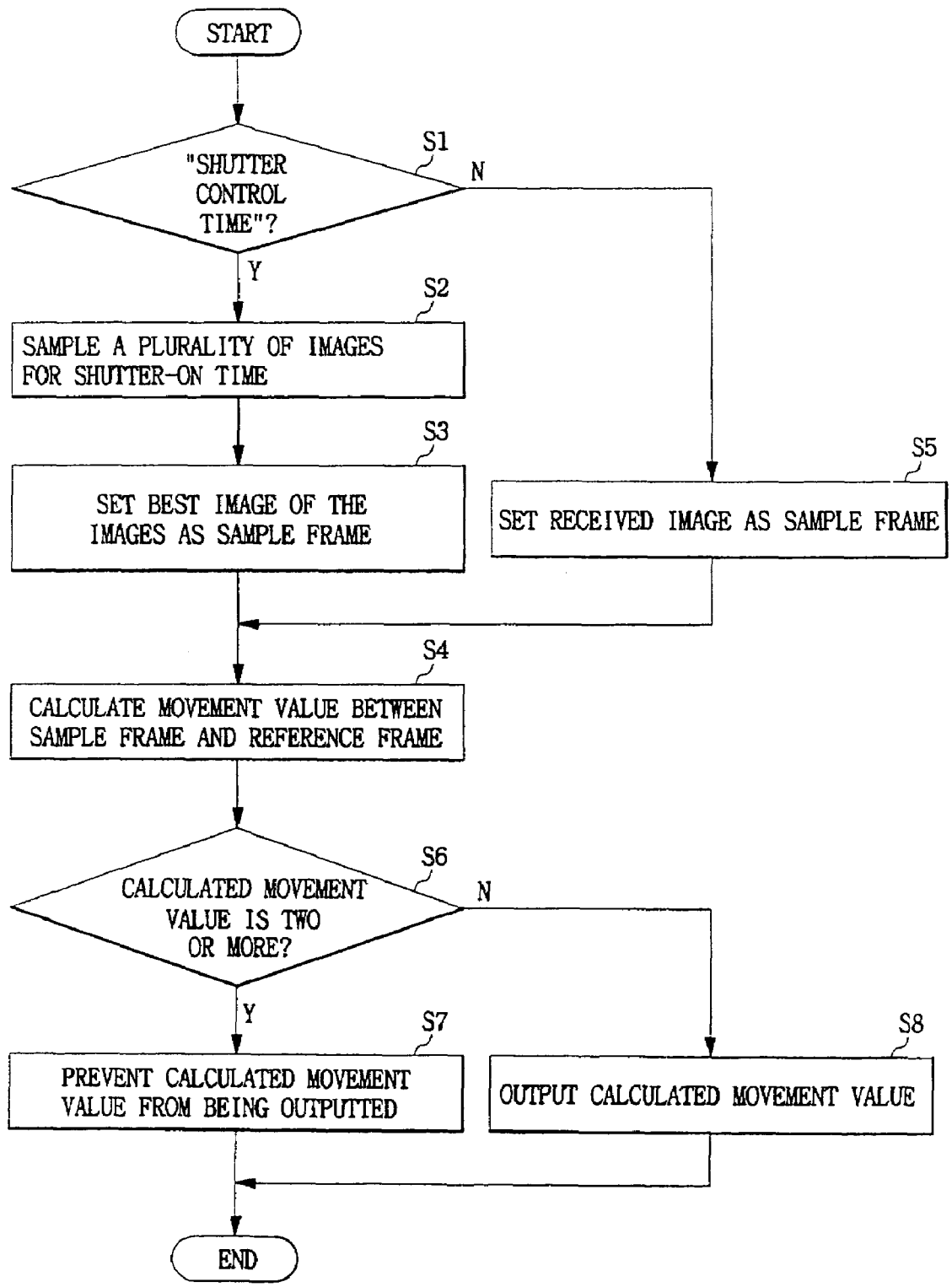
FIG. 6 is a flow chart for explaining a method for preventing abnormal operation of an image data processor of the present invention.

FIG. 6 is a flow chart for explaining a method for preventing abnormal operation of an image data processor of the present invention.

When an image of a digital signal type is transmitted from the A/D converter 200, an average value of the image is obtained. A shutter-on time corresponding to the obtained average value is calculated. By comparing the currently calculated shutter-on time with a previously calculated shutter-on time, it is checked whether the shutter-on time is continuously increased or decreased. On the basis of the checked result, it is determined whether or not a "shutter control time" period is present (S1).

If it is determined that the optical mouse is within the "shutter control time" period in the step S1, a shutter control signal Shutter_ctrl and a sampling control signal Sampling_ctrl as indicated by reference symbols (C) and (D) of FIG. 5, respectively, are generated and transmitted to the image sensor 100. Thus, the plurality of images transmitted from the image sensor 100 are received (S2).

One of the received images, i.e., the image reflecting a profile of the surface with the highest accuracy is selected (S3).

The selected image is set as a sample frame. A location of the sample frame having the highest correlation with a reference region of a reference frame is found, and then the moved direction and distance V(X, Y), i.e., the movement value is calculated (S4).

However, as the determined result of the step S1, if the optical mouse is not within the "shutter control time," the currently inputted image is set as the sample frame (S5), and there proceeds to the step S4.

It is determined whether or not the calculated movement value is two or more (S6). If the calculated movement value is one, it is considered that the optical mouse is normally operated, and thus the calculated movement value is outputted (S7).

However, as the determined result of the step S6, if the calculated movement value is two or more, it is considered that the optical mouse is abnormally operated, and thus the calculated movement value is not outputted (S8).

In this manner, when the optical mouse of the present invention is within the "shutter control time" period where the shutter-on time continuously increased or decreased, it is determined that the optical mouse passes through an interface of the surface having an obvious difference in brightness, and thus the plurality of images are obtained. Thereby, the optical mouse is prevented from the abnormal operation.

Figure 7:
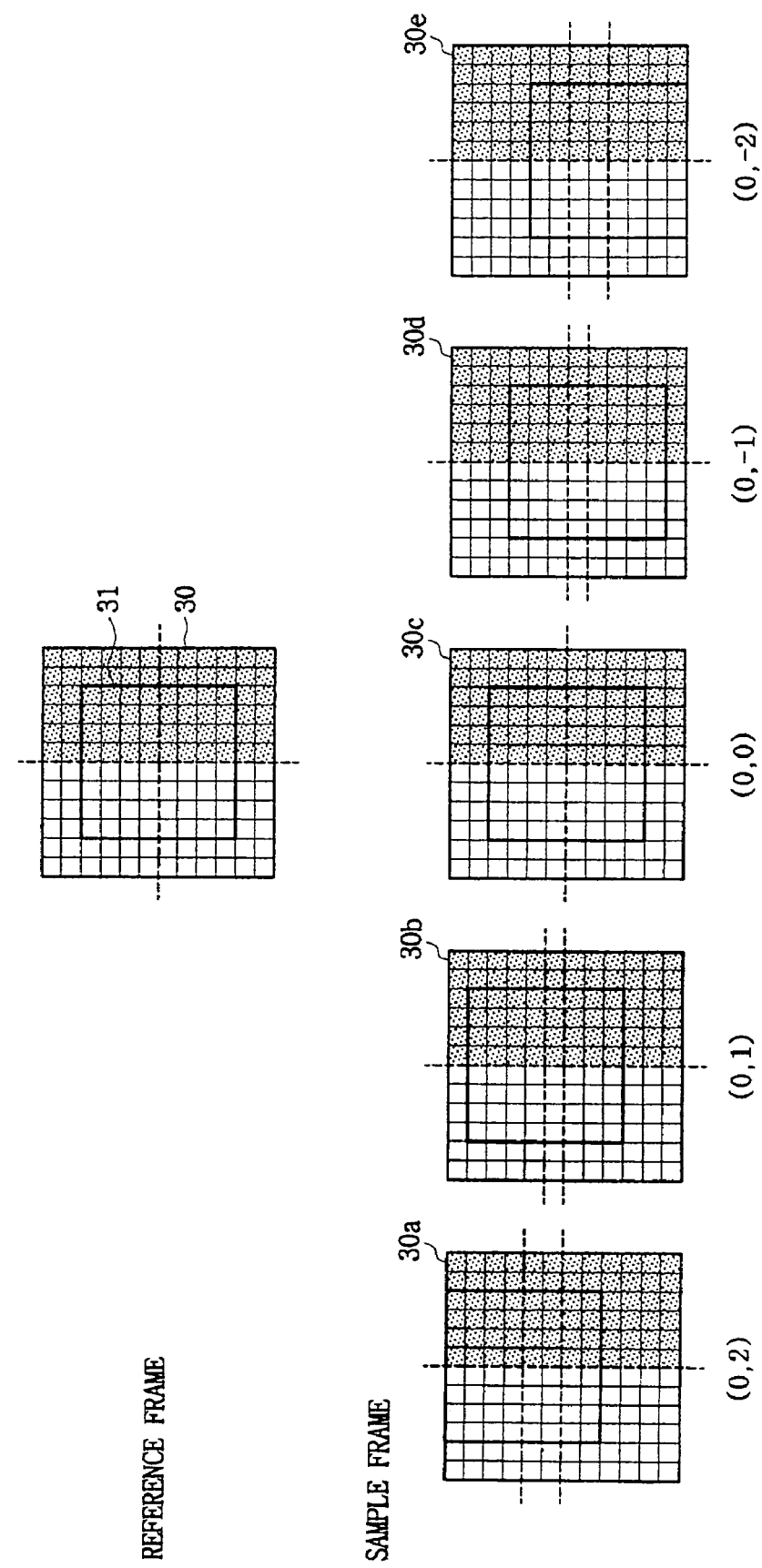
FIG. 7 shows images obtained when an optical mouse passes through an interface having an obvious difference in brightness in a vertical direction, and a correlation between them.
Figure 8:
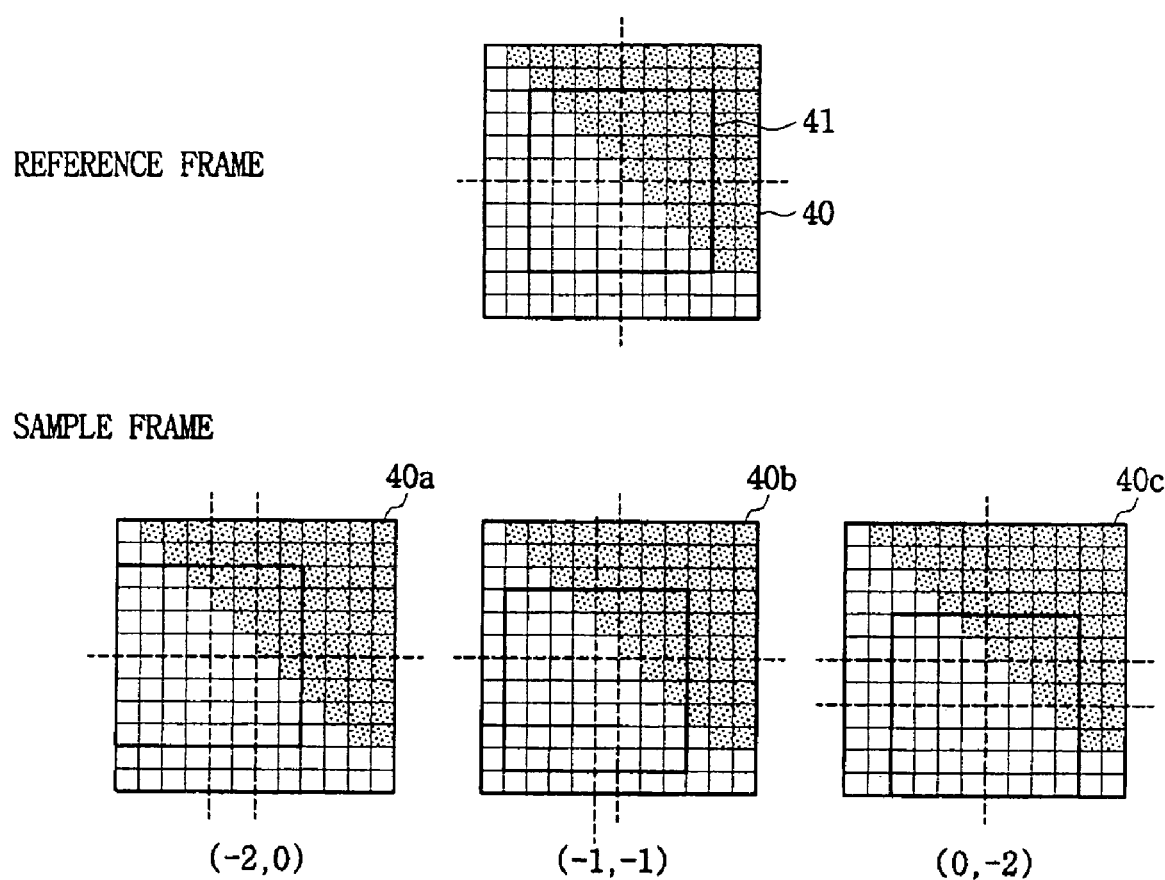
FIG. 8 shows images obtained when an optical mouse passes through an interface having an obvious difference in brightness in a diagonal direction, and a correlation between them.

Even in the case where the optical mouse calculates a plurality of movement values as in the step S8, as shown in FIGS. 7 and 8, this is sensed by the image data processor of the present invention. This sensing causes the image data processor to function to prevent the abnormal operation of the optical mouse.

In the following cases, the image data processor of the present invention calculates the plurality of movement values.

First, as shown in FIG. 7, the first case is where images of the sample and reference frames have the obvious difference in brightness in a vertical direction.

The movement values are found by comparing the reference region 31 of a reference frame 30 with a sample frame 32. There are obtained five (5) values as follows: when a reference region 31 is shifted by +2 in the Y-axial direction (0, 2), when by +1 in the Y-axial direction (0, 1), when not shifted (0, 0), when by −1 in the Y-axial direction (0, −1) and when by −2 in the Y-axial direction (0, −2). These five values have the highest correlation. Therefore, the movement values of the optical mouse are five kinds.

Further, as shown in FIG. 8, the second case is where images of the sample and reference frames have the obvious difference in brightness in a diagonal direction.

The movement values are found by comparing a reference region 41 of a reference frame 40 with a sample frame 42. There are obtained three (3) values as follows: when the reference region 41 is shifted by −2 in the Y-axial direction (0, −2), when by −1 in the X-axial direction and by −1 in the Y-axial direction (−1, −1) and when by +2 in the Y-axial direction (0, +2). These three values have the highest correlation. Therefore, the movement values of the optical mouse are three kinds.

In the present invention, if there are the plurality of movement values, by preventing the calculated movement values of the optical mouse from being outputted, the abnormal operation of the optical mouse is prevented. However, if necessary, by recognizing the previously calculated movement value of the optical mouse to be the current movement value of the optical mouse and outputting the previously calculated movement value of the optical mouse, the abnormal operation of the optical mouse may be prevented.

In consideration of the general movement of the optical mouse, there is a low probability that the optical mouse is to sharply change its motion. Further, the optical mouse passes through the interface having the obvious difference in brightness for a very short time, and at this time, the probability that the optical mouse is to sharply change its motion is more lowered.

For this reason, even though the current movement value of the optical mouse is substituted by the previously calculated movement value of the optical mouse, it is rarely that the optical mouse is abnormally operated.

Although a preferred embodiment of the present invention has been described for illustrative purposes, those skilled in the art will appreciate that various modifications, additions and substitutions are possible, without departing from the scope and spirit of the present invention as disclosed in the accompanying claims.

As set forth above, according to the optical mouse and method for preventing abnormal operation of the same, by sensing the time when the optical mouse passes through the interface having the obvious difference in brightness and preventing the wrong movement value from being outputted, it is possible to prevent abnormal operation of the optical mouse.

What is claimed is:

1. A method for preventing malfunction of an optical mouse, the method comprising:
    a first step of detecting whether the optical mouse passes through a boundary surface having a distinct difference between brightness and darkness, using continuous variation in exposure time of an image sensor when the optical mouse passes through the boundary surface, and sampling and obtaining a plurality of frames of brightness and darkness groups existing on the surface according to appropriate exposure times of the groups;
    a second step of calculating a movement value using the plurality of frames obtained in the first step; and
    a third step of outputting the calculated movement value of the optical mouse under the condition that only one movement value has a highest correlation, and not outputting the calculated movement value under the condition that at least two movement values have the highest correlation.

2. The method according to claim 1, wherein the second step comprises:
    a fourth step of selecting a pixel value of a time in which a best image is formed on the surface, among the entire pixel values of the plurality of frames obtained in the first step; and
    a fifth step of calculating the movement value of the optical mouse using the pixel value selected in the fourth step.

3. The method according to claim 1, wherein the third step comprises:
    a sixth step of calculating the movement value between the sampled frames to obtain the highest correlation;
    a seventh step of determining whether at least two movement values having the highest correlation exist;
    an eighth step of outputting the movement value having the highest correlation when it is determined that one movement value having the highest correlation exists in the seventh step; and a ninth step of not outputting the movement value having the highest correlation when at least two movement values having the highest correlation exist in the seventh step.

4. An method of preventing malfunction of an optical mouse, the method comprising:
- a first step of detecting whether the optical mouse passes through a boundary surface having a distinct difference between brightness and darkness, using continuous variation in exposure time of an image sensor when the optical mouse passes through the boundary surface, and sampling and obtaining a plurality frames of brightness and darkness groups existing on the surface according to appropriate exposure times of the groups;
- a second step of calculating a movement value using the plurality of frames obtained in the first step; and
- a third step of outputting the calculated movement value of the optical mouse under the condition that only one movement value has a highest correlation when the movement value is calculated, and storing a previous movement value, replacing the currently calculated movement value with the previous movement value, and outputting the replaced movement value when at least two movement values have the highest correlation.

5. The method according to claim 4, wherein the third step comprises:
- a fourth step of calculating the movement value using the plurality of frames to obtain the highest correlation;
- a fifth step of determining whether at least two movement values having the highest correlation exist;
- a sixth step of outputting the movement value having the highest correlation when it is determined that one movement value having the highest correlation exists in the fifth step; and
- a seventh step of, when at least two movement values having the highest correlation exist in the fifth step, storing a previous movement value, replacing the currently calculated movement value with the previous movement value, and outputting the replaced value.

6. An optical mouse comprising:
- an image sensor for detecting whether the optical mouse passes through a boundary surface having a distinct difference between brightness and darkness, carrying out continuous variation in exposure time when the optical mouse passes through the boundary surface, and obtaining a plurality of frames depending on variation in exposure time when the exposure time is continuously increased or decreased;
- an A/D converter for receiving an output of the image sensor and converting the output into a digital signal; and
- an image data processor for receiving an output of the A/D converter, and calculating a movement value having a highest correlation from the plurality of frames and not outputting the movement value for preventing malfunction of optical mouse when at least two movement values exist, and outputting the movement value of the optical mouse when the plurality of movement values do not exist.

* * * * *